United States Patent
Li et al.

(10) Patent No.: US 11,553,231 B2
(45) Date of Patent: Jan. 10, 2023

(54) REMOTE CONTROLLER, SCREEN PROJECTION RECEIVING COMPONENT, TELEVISION, SCREEN PROJECTION SYSTEM AND SCREEN PROJECTION METHOD

(71) Applicant: Beijing Xiaomi Mobile Software Co., Ltd., Beijing (CN)

(72) Inventors: Xiaoshuang Li, Beijing (CN); Jianhui Zhou, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/879,294

(22) Filed: May 20, 2020

(65) Prior Publication Data

US 2021/0211601 A1 Jul. 8, 2021

(30) Foreign Application Priority Data

Jan. 15, 2020 (CN) .......................... 202010043031.0

(51) Int. Cl.
*H04N 21/422* (2011.01)
*H04N 21/47* (2011.01)
(Continued)

(52) U.S. Cl.
CPC . *H04N 21/42204* (2013.01); *H04N 21/41265* (2020.08); *H04N 21/47* (2013.01); *H04N 21/42228* (2013.01); *H04N 21/478* (2013.01)

(58) Field of Classification Search
CPC ........... H04N 21/812; H04N 21/47202; H04N 21/4667; H04N 21/4755; H04N 21/4316;
(Continued)

(56) References Cited

U.S. PATENT DOCUMENTS

2011/0298594 A1\* 12/2011 Mish ...................... G08C 23/04
340/12.22
2013/0194510 A1\* 8/2013 Freundlich ..... H04N 21/440227
348/723
(Continued)

FOREIGN PATENT DOCUMENTS

CN 103595944 A 2/2014
CN 107493484 A 12/2017
(Continued)

OTHER PUBLICATIONS

Supplementary European Search Report in the European application No. 20177359.5, dated Jun. 24, 2020.
(Continued)

*Primary Examiner* — Samira Monshi
(74) *Attorney, Agent, or Firm* — Finnegan, Henderson, Farabow, Garrett & Dunner, L.L.P.

(57) ABSTRACT

A remote controller, includes: a first interface; and a first wireless portion connected with the first interface, wherein the first interface is connected with a screen projection device, the first wireless portion is wirelessly connected with a display device, and the first wireless portion receives data to be projected by the screen projection device through the first interface, and sends the data to be projected to the display device for displaying.

14 Claims, 5 Drawing Sheets

(51) Int. Cl.
*H04N 21/41* (2011.01)
*H04N 21/478* (2011.01)

(58) Field of Classification Search
CPC ....... H04N 21/25891; H04N 21/42204; H04N 21/41265; H04N 21/482; H04N 21/4532; H04N 21/47
See application file for complete search history.

(56) References Cited

U.S. PATENT DOCUMENTS

| | | | |
|---|---|---|---|
| 2014/0162560 A1 | 6/2014 | Ye et al. | |
| 2015/0121466 A1 | 4/2015 | Brands et al. | |
| 2015/0262420 A1* | 9/2015 | Arun | G06F 9/5066 345/420 |
| 2016/0323634 A1* | 11/2016 | Skowronski | H04N 21/41407 |
| 2017/0087457 A1* | 3/2017 | Matsukawa | A63F 13/92 |
| 2019/0066552 A1* | 2/2019 | Takagi | G09G 3/002 |
| 2020/0287735 A1 | 9/2020 | Liao | |

FOREIGN PATENT DOCUMENTS

| | | |
|---|---|---|
| CN | 108595137 A | 9/2018 |
| CN | 109379549 A | 2/2019 |
| CN | 109819201 A | 5/2019 |
| JP | 2010-261989 A | 11/2010 |
| JP | 2017-69983 A | 4/2017 |
| JP | 2018-116347 A | 7/2018 |
| KR | 20080064668 A | 7/2008 |
| KR | 101372242 B1 | 3/2014 |

OTHER PUBLICATIONS

Notice of Reasons for Refusal dated Aug. 17, 2021, from The Japanese Patent Office in counterpart Japanese Application No. 2020-84229.

Office Action dated Jan. 10, 2022, from the State Intellectual Property Office of People's Republic of China issued in counterpart Chinese Application No. 202010043031.0.

Office Action dated Mar. 21, 2022, from the European Patent Office issued in counterpart European Application No. 20177359.5.

* cited by examiner

REMOTE CONTROLLER, SCREEN PROJECTION RECEIVING COMPONENT, TELEVISION, SCREEN PROJECTION SYSTEM AND SCREEN PROJECTION METHOD

CROSS-REFERENCE TO RELATED APPLICATIONS

This application is based upon and claims priority to Chinese Patent Application No. 202010043031.0 filed on Jan. 15, 2020, the content of which is hereby incorporated by reference in its entirety.

TECHNICAL FIELD

The present disclosure generally relates to the technical field of electronics, and more particularly to a remote controller, a screen projection receiving component, a screen projection system and a screen projection method.

BACKGROUND

A wireless screen projection technology refers to transmitting various multimedia information such as a video, an audio and a document in a terminal device (a computer, a mobile phone and a tablet, etc.) to an intermediate wireless screen projector through a wireless network, and sending the various multimedia information to a display device through the wireless screen projector, to synchronize a current operation content on the terminal device to a display screen of the display device in real time.

Daily meetings are necessary to enterprises. In the related art, a meeting tablet is used with a wireless screen delivering device to meet requirements of high efficiency and convenience. However, the meeting tablet and the wireless screen delivering device may have high manufacturing costs and expensive prices, resulting a low performance-cost ratio. Moreover, the meeting tablet and the wireless screen projector should be used together to implement wireless screen projection.

SUMMARY

According to a first aspect of embodiments of the present disclosure, a remote controller may include a first interface and a first wireless portion connected with the first interface. The first interface may be connected with a screen projection device, and the first wireless portion may be wirelessly connected with a display device. The first wireless portion may receive data to be projected by the screen projection device through the first interface, and send the data to be projected to the display device for displaying.

According to a second aspect of the embodiments of the present disclosure, a screen projection receiving component may be wirelessly connected with the remote controller in the first aspect, and include: a second wireless portion wirelessly connected with a first wireless portion; and a second interface connected with the second wireless portion. The second wireless portion may be configured to receive data to be projected sent by the first wireless portion. The second interface may be connected with a display device. The second wireless portion may receive the data to be projected sent by the first wireless portion and transmit the data to be projected to the display device through the second interface for displaying.

According to a third aspect of the embodiments of the present disclosure, a television may include the screen projection receiving component in the second aspect, and the screen projection receiving component is integrated into a circuit board of the television.

According to a fourth aspect of the embodiments of the present disclosure, a screen projection system may include: a screen projection device; a remote controller comprising a first interface and a first wireless portion connected with the first interface; and a display device, wherein the remote controller is connected with the screen projection device through the first interface; the first wireless portion of the remote controller is wirelessly connected with a second wireless portion of a screen projection receiving component for the display device; and the first wireless portion receives data to be projected by the screen projection device through the first interface and sends the data to be projected to the second wireless portion, and the display device receives the data to be projected through the second wireless portion and displays the data to be projected.

According to a fifth aspect of the embodiments of the present disclosure, a screen projection method may include operations as follows. A remote controller receives data to be projected from a screen projection device, and the remote controller sends the data to be projected to a display device. The remote controller may include a first interface and a first wireless portion connected with the first interface. The first interface may be connected with the screen projection device and the first wireless portion may be connected with the display device.

It is to be understood that the above general description and the following detailed description are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

Embodiments of the present disclosure provide a remote controller. The remote controller is used as a connection carrier between a screen projection device and a display device to implement wireless screen projection, thereby reducing the cost, and having a high performance-cost ratio.

Figure 1:
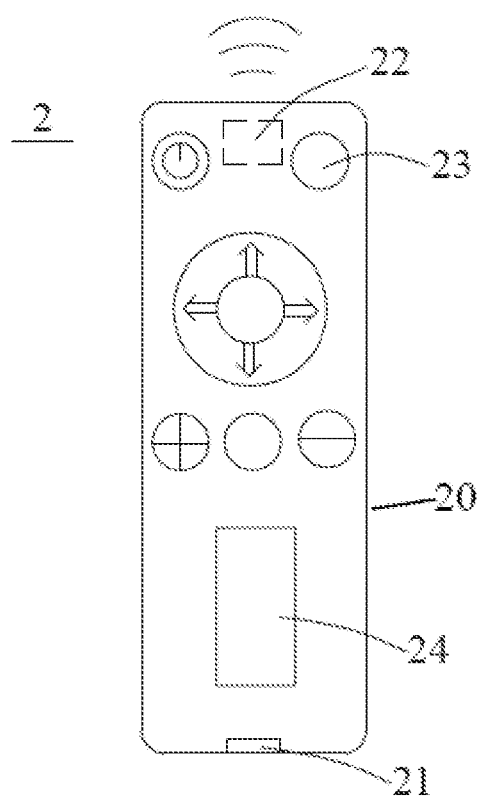
FIG. 1 is a schematic diagram of a remote controller according to an exemplary embodiment of the present disclosure.
Figure 2:
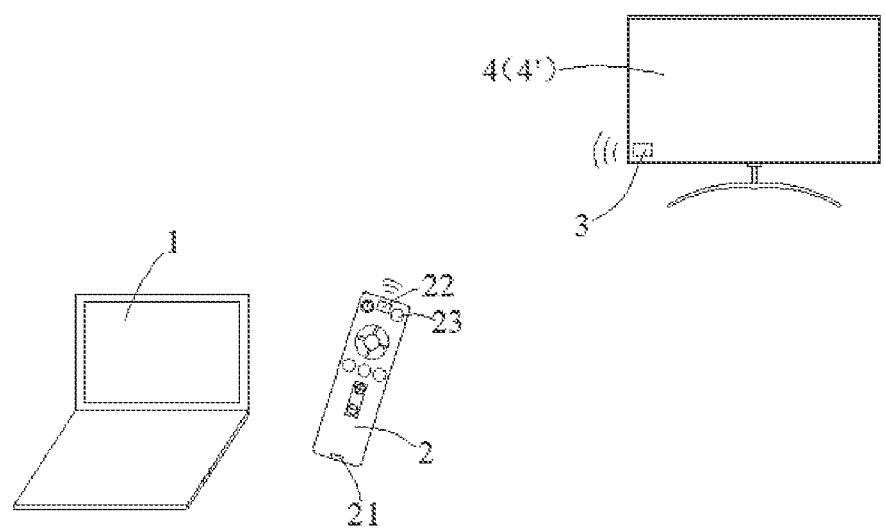
FIG. 2 is a schematic diagram of a screen projection system according to an exemplary embodiment of the present disclosure.

FIG. 1 is a schematic diagram of a remote controller 2 according to an exemplary embodiment of the present disclosure. FIG. 2 is a schematic diagram of a screen projection system including the remote controller 2 according to an exemplary embodiment of the present disclosure.

As shown in FIG. 1 and FIG. 2, the remote controller 2 includes a remote controller body 20, a first interface 21 and a first wireless portion 22 connected with the first interface 21. The first interface 21 and the first wireless portion 22 are arranged on the remote controller body 20.

The first interface 21 establishes a communication connection with a screen projection device 1, and is configured to charge the remote controller 2. In the embodiment, the screen projection device 1 may be an electronic device such as a computer, a tablet and a mobile phone, which can transmit data to be projected to a display device 4. Descriptions are made in the following embodiments with taking a computer as an example of the screen projection device 1, but the present disclosure is not limited thereto. For example, the first interface 21 may be a USB (micro-USB) interface, a lightning interface, a Type-C interface and the like. For improving a transmission rate, the first interface 21 is preferably the USB (micro-USB) interface. A power supply module 24 is arranged on the remote controller body 20. The first interface 21 is connected with the screen projection device 1 through a USB data line and receives power from the screen projection device 1 to supply power to the power supply module 24, thereby supplying power to the remote controller 2. The power supply module 24 may be a lithium battery.

The first wireless portion 22 is configured to establish a wireless connection with the display device 4. The display device 4 may be, for example, a television, a computer display screen, a liquid crystal screen and other type of an electronic display screen. In the following embodiments, the television is taken as an example of the display device 4, but the present disclosure is not limited thereto. The first wireless portion 22 receives the data to be projected by the screen projection device 1 through the first interface 21 and sends the data to be projected to the display device 4 for displaying. The data to be projected may be display data (e.g., text data, image data, video data, etc.) and/or audio data. The first wireless portion 22 may be a WIFI chip, which can simultaneously transmit the display data and the audio data.

In the embodiment, after the remote controller 2 is connected with the screen projection device 1 through the first interface 21, the screen projection device 1 automatically runs an application (APP), captures display data and/or audio data on a display screen of the screen projection device 1 through the APP and sends the display data and the audio data to the remote controller 2. The first wireless portion 22 in the remote controller 2 sends the display data and/or audio data on the screen projection device 1 to the display device 4. The display device 4 receives, transcodes and displays the display data and/or the audio data. In the embodiment, the remote controller 2 is used as a connection carrier between the screen projection device 1 and the display device 4 to implement wireless screen projection, thereby reducing the cost, and having a high performance-cost ratio.

In some embodiments, as shown in FIG. 1, a screen projection initiation button 23 is further arranged on the remote controller 2, and is connected with the first wireless portion 2 through a control portion (not shown in FIG. 1). The control portion is configured to, upon detecting that the screen projection initiation button 23 is triggered, control the first wireless portion 22 to receive the data to be projected transmitted through the first interface 21 and send the data to be projected to the display device 4.

In the embodiment, a button on the remote controller 2 may be reused as the screen projection initiation button 23. When the remote controller 2 is connected with the screen projection device 1 through the first interface 21, the screen projection initiation button 23 is pressed, and after the screen projection initiation button 23 is triggered, the control portion controls the first wireless portion 22 to receive the data to be projected transmitted through the first interface 21 and sends the data to be screen to the display device 4.

The technical solutions provided in the embodiments of the present disclosure may have the following beneficial effects. The remote controller is connected with the screen projection device through the first interface, and establishes a wireless connection with the display device through the first wireless portion to display the data to be projected on the display device. The remote controller is used as a connection carrier between the screen projection device and the display device, thereby reducing the cost, and having a high performance-cost ratio.

Figure 3:
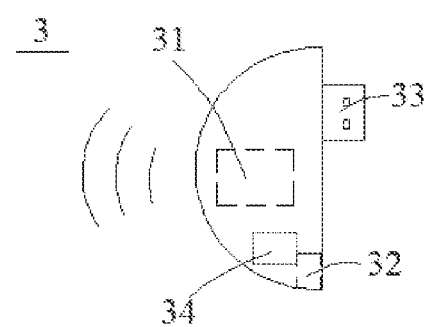
FIG. 3 is a schematic diagram of a screen projection receiving component according to an exemplary embodiment of the present disclosure.

Embodiments of the present disclosure also provide a screen projection receiving component 3 on the display device 4, as shown in FIG. 2. FIG. 3 is a schematic diagram of the screen projection receiving component 3 according to an exemplary embodiment of the present disclosure.

In the embodiment, the screen projection receiving component 3 is wirelessly connected with the remote controller 2, and is configured to receive data to be projected that is sent by the remote controller 2. The screen projection receiving component 3 includes a second wireless portion 31 and a second interface 32.

The second wireless portion 31 is wirelessly connected with the first wireless portion 22 in the remote controller 2, the first wireless portion 22 is configured to send the data to be projected to the second wireless portion 31, and the second wireless portion 31 is configured to receive the data to be projected sent by the first wireless portion 22. The second wireless portion 31 may be a WIFI chip.

The second interface 32 is connected with the second wireless portion 31. The second wireless portion 31 transmits the received data to be projected to the display device 4 through the second interface 32 for displaying. The second interface 32 may be an interface configured to transmit video and audio signals such as an HDMI and a Display Port (DP). Preferably, the second interface 32 is an HDMI.

In an embodiment, the screen projection receiving component 3 may further include a third interface 33, and the third interface 33 is connected with the display device 4 and supply power to the screen projection receiving component 3. The third interface 33 may be a USB interface.

In an embodiment, the screen projection receiving component 3 may further include a processor 34, After the display data and/or the audio data is processed through the processor 34 (e.g., an H2 chip of Allwinner), the processed display data and/or the audio data is transmitted to the display device 4 through the second interface 32 for transcoding and displaying.

Embodiments of the present disclosure also provide a television. As shown in FIG. 2, the display device 4 may be a television 4' that includes the screen projection receiving component 3. The screen projection receiving component 3 may be integrated into a circuit board of the television 4'.

Embodiments of the present disclosure also provide a screen projection system. As shown in FIG. 2, the screen projection system includes the screen projection device 1, the remote controller 2, and the television 4'. The remote controller 2 is connected with the screen projection device 1 through the first interface 21, and the first wireless portion 22 of the remote controller 2 is wirelessly connected with the second wireless portion 31 of the screen projection receiving component 3 in the television 4'. The first wireless portion 22 receives data to be projected by the screen projection device 1 through the first interface 21 and sends the data to be projected to the second wireless portion 31. The television 4' receives the data to be projected through the second wireless portion 31 and displays the data to be projected. The data to be projected may be display data and/or audio data.

In the embodiment, after the remote controller 2 is connected with the screen projection device 1 through the first interface 21, the screen projection device 1 automatically runs an APP, captures display data and/or audio data on the screen projection device 1 through the APP and sends the display data and the audio data to the remote controller 2. The first wireless portion 22 of the remote controller 2 sends the display data and/or the audio data to the second wireless portion 31 of the screen projection receiving component 3 in the television 4', and the television 4' receives the display data and/or the audio data through the second wireless portion 31 and transcodes and displays the display data and/or the audio data. In the embodiment, the screen projection device 1 may be a computer, a tablet or a mobile phone. The remote controller 2 may be a television remote controller. The television remote controller 2 is used as a connection carrier between the screen projection device 1 and the television 4' to implement wireless screen projection, thereby reducing the cost, and having a high performance-cost ratio.

Figure 4:
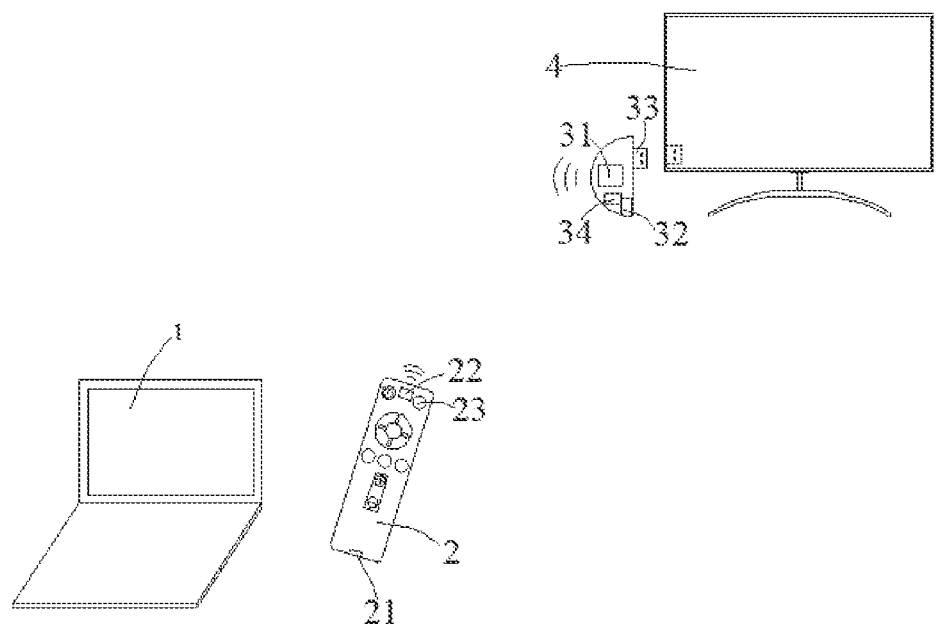
FIG. 4 is a schematic diagram of a screen projection system according to another exemplary embodiment of the present disclosure.

FIG. 4 is a schematic diagram of a screen projection system according to an exemplary embodiment of the present disclosure. As shown in FIG. 4, the screen projection system includes the screen projection device 1, the remote controller 2, the display device 4, and the screen projection receiving component 3. The first interface 21 of the remote controller 2 is connected with the screen projection device 1, and receives data to be projected. The second interface 32 of the screen projection receiving component 3 is connected with the display device 4, and the second interface 32 transmits the data to be projected to the display device 4. The screen projection receiving component 3 is separate from the display device 4, that is, the screen projection receiving component 3 is arranged outside the display device 4. The screen projection receiving component 3 is connected with the display device 4 through the third interface 33, for supplying power to the screen receiving projection component 3. The second wireless portion 31 of the screen projection receiving component 3 is wirelessly connected with the first wireless portion 22 of the remote controller 2, and the second wireless portion 31 receives data to be projected sent by the first wireless portion 22. The first wireless portion 22 receives the data to be projected by the screen projection device 1 through the first interface 21 and sends the data to be projected to the second wireless portion 31. The second wireless portion 31 receives the data to be projected and transmits the data to be projected to the display device 4 through the second interface 32 for displaying.

In the embodiment, after the remote controller 2 is connected with the screen projection device 1 through the first interface 21, the screen projection device 1 automatically runs an APP, captures display data and/or audio data on a display screen of the screen projection device 1 through the APP and sends the display data and the audio data to the remote controller 2. The first wireless portion 22 of the remote controller 2 sends the display data and/or audio data of the screen projection device 1 to the screen projection receiving component 3, and the screen projection receiving component 3 receives the display data and/or the audio data through the second wireless portion 31 and, after the display data and/or the audio data is processed through the processor 34 (e.g., an H2 chip of Allwinner), transmits the processed display data and/or the audio data to the display device 4 through the second interface 32 for transcoding and displaying.

The screen projection system may serve as an office meeting system. The remote controller 2 and the screen projection receiving component 3 are used as connection carriers between the screen projection device 1 and the display device 4, thereby reducing the cost and having a high performance-cost ratio, and greatly improving compatibility, universality and flexibility in use.

In an embodiment, the screen projection device 1 is a computer, a tablet or a mobile phone, the display device 4 is a television display screen, and the remote controller 2 is a television remote controller.

In an embodiment, the remote controller is improved based on an existing television product as a connection carrier between the computer and the television. Therefore, an ordinary television is improved into a basic meeting system for application of the television into an office scene, thereby implementing wireless transmission with relatively low cost, and optimizing screen projection experience between the television and the computer.

In the embodiment, the screen projection device 1 wirelessly communicates with the display device 4 through the external remote controller 2 and the external screen projection receiving component 3 without adapting or developing a sending and receiving modules in the display device 4 and the screen projection device 1. In an embodiment, the display device 4 may be a display device having no wireless transmission function. For example, the screen projection receiving component 3 may be connected with the television display screen or the computer display screen through the second interface 32, and the remote controller 2 may be connected with a computer or a tablet through the first interface 21, thereby greatly improving the compatibility, universality and flexibility in use of the screen projection device. In addition, the screen projection device 1 communicates with the display device 3 through mutually independent wireless transmission modules, and no wireless portion in the screen projection device 1 is occupied, thereby improving data transmission stability.

Figure 5:
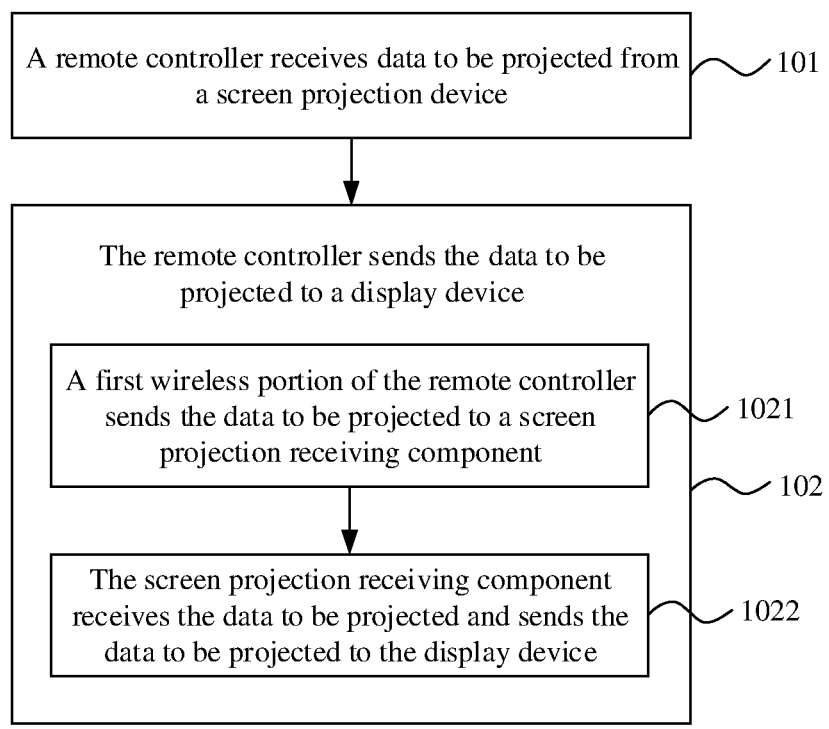
FIG. 5 is a flow chart of a screen projection method according to an exemplary embodiment of the present disclosure.

Embodiments of the present disclosure also provide a screen projection method. FIG. 5 is a flow chart of a screen projection method according to an exemplary embodiment of the present disclosure. Referring to FIGS. 1-5, the screen projection method includes the following operations.

At operation 101, a remote controller 2 receives data to be projected from a screen projection device 1. The data to be projected may be display data and/or audio data.

In the embodiment, the remote controller 2 includes a first interface 21 and a first wireless portion 22 connected with the first interface 21. The first interface 21 is connected with the screen projection device 1, and the first wireless portion 22 is wirelessly connected with a display device 4.

The remote controller 2 is connected with the screen projection device 1 through the first interface 21, and the screen projection device 1 automatically runs an APP, captures the data to be projected on a screen through the APP and sends the data to be projected to the remote controller 2.

At operation 102, the remote controller sends the data to be projected to a display device 4.

The first wireless portion 22 of the remote controller 2 sends the data to be projected to the display device 4, and the display device 4 receives, transcodes and displays the data to be projected.

In an embodiment, operation 102 further includes the following operations 1021 and 1022.

At operation 1021, the remote controller 2 sends the data to be projected to a screen projection receiving component 3 through the first wireless portion 22.

At operation 1022, the screen projection receiving component 3 receives the data to be projected and sends the data to be projected to the display device 4.

The screen projection receiving component 3 includes a second wireless portion 31 and a second interface 32, the second interface 32 is connected with the display device 4, and the second wireless portion 31 is configured to receive the data to be projected and send the data to be projected to the display device through the second interface 32.

In the embodiment, the first wireless portion 22 of the remote controller 2 sends the data to be projected by the screen projection device 1 to the screen projection receiving component 3, and the screen projection receiving component 3 receives the data to be projected through the second wireless portion 31 and, after the data to be projected is processed through a processing module 34 (e.g., an H2 chip of Allwinner), transmits the processed data to be projected to the display device 4 through the second interface 32 for transcoding and displaying.

In the embodiment, the screen projection device 1 wirelessly communicates with the display device 4 through the external remote controller 2 and the external screen projection receiving component 3 without adapting or developing sending and receiving modules in the display device 4 and the screen projection device 1. In an embodiment, the display device 4 may be a display device having no wireless transmission function. For example, the screen projection receiving component 3 may be connected with the television display screen or the computer display screen through the second interface 32, and the remote controller 2 may be connected with a computer or a tablet through the first interface 21, thereby greatly improving the compatibility, universality and flexibility in use of the screen projection device. In addition, the screen projection device 1 communicates with the display device 3 through mutually independent wireless transmission modules, and no wireless portion in the screen projection device 1 is occupied, thereby improving data transmission stability.

Terms used in the disclosure are for the purpose of describing exemplary embodiments only and are not intended to limit the disclosure. For example, the terms "first," "second" and the like are used to describe various information but the information is not limited to these terms. These terms are only used to distinguish information of the same type rather than representing a specific sequence or importance. For example, without departing from the scope of the present disclosure, first information may also be referred to as second information and, similarly, second information may also be referred to as first information.

Furthermore, in the embodiments of the present disclosure, although the operations are executed in a specific sequence in the accompanying drawings, it should not be regarded that these operations are executed according to the specific sequence or in series, or all the illustrated operations are executed to obtain an expected result. In some embodiments, multiple tasks and parallel processing may be used.

Other implementations of the present disclosure will be apparent to those skilled in the art from consideration of the specification and practice of the present disclosure. This application is intended to cover any variations, uses, or adaptations of the present disclosure conforming to the general principles thereof and including such departures from the present disclosure as come within known or customary practice in the art. It is intended that the specification and embodiments are considered as exemplary only, while a true scope and spirit of the present disclosure are indicated by the following claims.

It will be appreciated that the present disclosure is not limited to the exact construction described above and illustrated in the accompanying drawings, and that various modifications and changes may be made without departing from the scope thereof. The scope of the present disclosure is only to be limited by the appended claims.

What is claimed is:

1. A remote controller, comprising:
a first interface; and
a first wireless portion connected with the first interface,
wherein the first interface is connected with a screen projection device,
the first wireless portion is wirelessly connected with a display device, and
the first wireless portion receives data to be projected by the screen projection device through the first interface, and sends the data to be projected to the display device for displaying,
wherein the first interface comprises a Universal Serial Bus (USB) interface, the first interface is connected with the screen projection device through a USB data line, and the first interface is further configured to receive power from the screen projection device to charge the remote controller.

2. The remote controller of claim 1, further comprising:
a screen projection initiation button connected with the first wireless portion through a control portion,
wherein the control portion is configured to, upon detecting that the screen projection initiation button is triggered, control the first wireless portion to receive the data to be projected transmitted through the first interface and send the data to be projected to the display device.

3. The remote controller of claim 1, wherein the first wireless portion comprises a Wireless Fidelity (WIFI) chip.

4. A screen projection receiving component wirelessly connected with the remote controller of claim 1, wherein the screen projection receiving component comprises:
a second wireless portion connected with the first wireless portion; and
a second interface connected with the second wireless portion, wherein the second wireless portion is configured to receive data to be projected that is sent by the first wireless portion;

the second interface is connected with the display device; and the second wireless portion receives the data to be projected sent by the first wireless portion and transmits the data to be projected to the display device through the second interface for displaying.

5. The screen projection receiving component of claim 4, wherein the second wireless portion comprises a Wireless Fidelity (WIFI) chip.

6. The screen projection receiving component of claim 4, wherein the second interface comprises a High-Definition Multimedia Interface (HDMI).

7. The screen projection receiving component of claim 4, further comprising:
a third interface connected with the display device, the third interface being configured to supply power to the screen projection receiving component.

8. The screen projection receiving component of claim 7, wherein the third interface comprises a Universal Serial Bus (USB) interface.

9. A television, comprising the screen projection receiving component of claim 4, wherein the screen projection receiving component is integrated into a circuit board of the television.

10. A screen projection system, comprising:
a screen projection device;
a remote controller comprising a first interface and a first wireless portion connected with the first interface; and
a display device,
wherein the remote controller is connected with the screen projection device through the first interface;
the first wireless portion of the remote controller is wirelessly connected with a second wireless portion of a screen projection receiving component for the display device; and
the first wireless portion receives data to be projected by the screen projection device through the first interface and sends the data to be projected to the second wireless portion, and the display device receives the data to be projected through the second wireless portion and displays the data to be projected,
wherein the first interface comprises a Universal Serial Bus (USB) interface, the first interface is connected with the screen projection device through a USB data line, and the first interface is further configured to receive power from the screen projection device to charge the remote controller.

11. The screen projection system of claim 10, wherein the screen projection device is one of a computer, a tablet, or a mobile phone.

12. The screen projection system of claim 10, wherein:
the screen projection receiving component is arranged outside the display device, wherein a second interface of the screen projection receiving component is connected with the display device, and the second wireless portion of the screen projection receiving component is wirelessly connected with the first wireless portion of the remote controller; and
the second wireless portion receives the data to be projected and transmits the data to be projected to the display device through the second interface for displaying.

13. The screen projection system of claim 12, wherein:
the display device is a television; and
the remote controller is a television remote controller.

14. A screen projection method, comprising:
receiving, by a remote controller, data to be projected from a screen projection device; and
sending, by the remote controller, the data to be projected to a display device,
wherein the remote controller comprises a first interface and a first wireless portion connected with the first interface, the first interface is connected with the screen projection device, and the first wireless portion is connected with the display device,
wherein the method further comprises:
sending, by the remote controller, the data to be projected to a screen projection receiving component through the first wireless portion; and
receiving, by the screen projection receiving component, the data to be projected and sending the data to be projected to the display device,
wherein the screen projection receiving component comprises a second wireless portion and a second interface, the second interface is connected with the display device, and the second wireless portion is configured to receive the data to be projected and send the data to be projected to the display device through the second interface.

* * * * *